United States Patent
Matthews, Jr.

(10) Patent No.: US 8,526,605 B2
(45) Date of Patent: Sep. 3, 2013

(54) DATA ENCRYPTION TO PROVIDE DATA SECURITY AND MEMORY CELL BIT WEAR LEVELING

(75) Inventor: Donald Preston Matthews, Jr., Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 898 days.

(21) Appl. No.: 12/576,544

(22) Filed: Oct. 9, 2009

(65) Prior Publication Data

US 2011/0085657 A1 Apr. 14, 2011

(51) Int. Cl.
*H04L 9/00* (2006.01)

(52) U.S. Cl.
USPC .................. 380/44; 380/277; 380/28

(58) Field of Classification Search
None
See application file for complete search history.

(56) References Cited

U.S. PATENT DOCUMENTS

| | | | |
|---|---|---|---|
| 4,074,066 A | 2/1978 | Ehrsam et al. | |
| 6,061,449 A | 5/2000 | Candelore et al. | |
| 6,236,729 B1 | 5/2001 | Takaragi et al. | |
| 6,366,117 B1 | 4/2002 | Pang et al. | |
| 6,957,340 B1 | 10/2005 | Pang et al. | |
| 7,221,756 B2 | 5/2007 | Patel et al. | |
| 7,428,306 B2 | 9/2008 | Celikkan et al. | |
| 8,189,407 B2 * | 5/2012 | Strasser et al. | 365/189.09 |
| 8,266,496 B2 * | 9/2012 | Flynn et al. | 714/758 |
| 2004/0083335 A1 | 4/2004 | Gonzalez et al. | |
| 2004/0131182 A1 | 7/2004 | Rogaway | |
| 2007/0081668 A1 | 4/2007 | McGrew et al. | |
| 2008/0065905 A1 * | 3/2008 | Salessi | 713/193 |
| 2008/0130872 A1 | 6/2008 | Bolotov et al. | |
| 2010/0153747 A1 * | 6/2010 | Asnaashari et al. | 713/193 |

OTHER PUBLICATIONS

IEEE Standard for Cryptographic Protection of Data on Block-Oriented Storage Devices, Apr. 18, 2008, pp. 1-32, 1619-2007, IEEE, New York, NY, US.

* cited by examiner

*Primary Examiner* — Pramila Parthasarathy
(74) *Attorney, Agent, or Firm* — Hall Estill Attorneys at Law

(57) ABSTRACT

Method and apparatus for encrypting and storing data to provide data security and memory cell bit wear leveling. In accordance with various embodiments, input data are provided for writing to a target page of memory in a storage array. A seed value is derived from a count value indicative of a number of times a write access has occurred on the target page of memory. A block encryption routine is applied to the input data using the seed value to generate encrypted output data that are thereafter written to the target page.

20 Claims, 6 Drawing Sheets

US 8,526,605 B2

DATA ENCRYPTION TO PROVIDE DATA SECURITY AND MEMORY CELL BIT WEAR LEVELING

SUMMARY

Various embodiments of the present invention are generally directed to a method and apparatus for encrypting and storing data to provide data security and memory cell bit wear leveling.

In accordance with various embodiments, input data are provided for writing to a target page of memory in a storage array. A seed value is derived in relation to a count value indicative of a number of write accesses previously carried out upon the target page. The seed value is used to encrypt the input data to form encrypted output data, and the encrypted output data are written to the target page.

These and other features and advantages which characterize the various embodiments of the present invention can be understood in view of the following detailed discussion and the accompanying drawings.

DETAILED DESCRIPTION

The present disclosure generally relates to data security and data write distribution. In accordance with various embodiments, a storage device is provided which employs an encryption scheme to convert input data (plaintext) into encoded data (ciphertext) prior to storage in a memory location, such as a page of memory in a solid-state drive (SSD). The encryption scheme distributes individual bit writes across the cells of the page of memory so that over time, each of the cells receive substantially the same number of writes. This advantageously provides wear leveling at the bit level, as well as an enhanced level of data security for the stored data.

Figure 1:
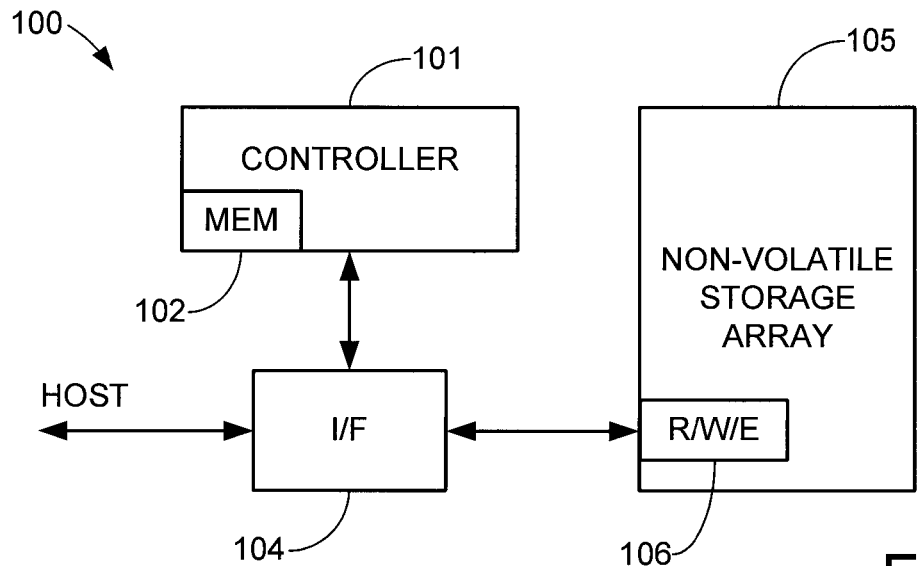
FIG. 1 provides a functional block representation of a data storage device.

FIG. 1 provides a functional block representation of an exemplary data storage device 100 in which various embodiments of the present invention can be advantageously practiced. While not limiting, for purposes of the present discussion it will be contemplated that the device 100 is characterized as a solid-state drive (SSD) that utilizes Flash memory cells arranged in a NAND configuration.

The device 100 includes a top level controller 101 with local memory (MEM) 102, an interface (I/F) circuit 104 and a non-volatile data storage array 105. The I/F circuit 104 operates under the direction of the controller 101 to transfer user data between the array 105 and a host device (not shown). In some embodiments, the controller 101 is a programmable microcontroller which operates in accordance with programming steps stored in MEM 102.

Data can be buffered in the OF circuit 104 pending a transfer of the data between the array 105 and the host device. Local read/write/erase (R/W/E) circuitry 106 facilitates read, write and erase operations upon the array 105. The data may be stored in fixed sized sectors (such as 512 kilobytes KB, 1024 KB, etc.).

In some embodiments, the host identifies the sectors via a logical block address (LBA) scheme so that host issues read and write requests in terms of LBAs (e.g., "retrieve LBAs 100-199"). The device 100 converts each LBA in a host access command to an associated physical sector address (PBA) indicative of the physical location for the data within the array 105. The host does not know, or care, the physical location of each LBA within the array. Indeed, the controller may change the PBA of the associated LBA each time a new data write command for the LBA is issued.

Figure 2:
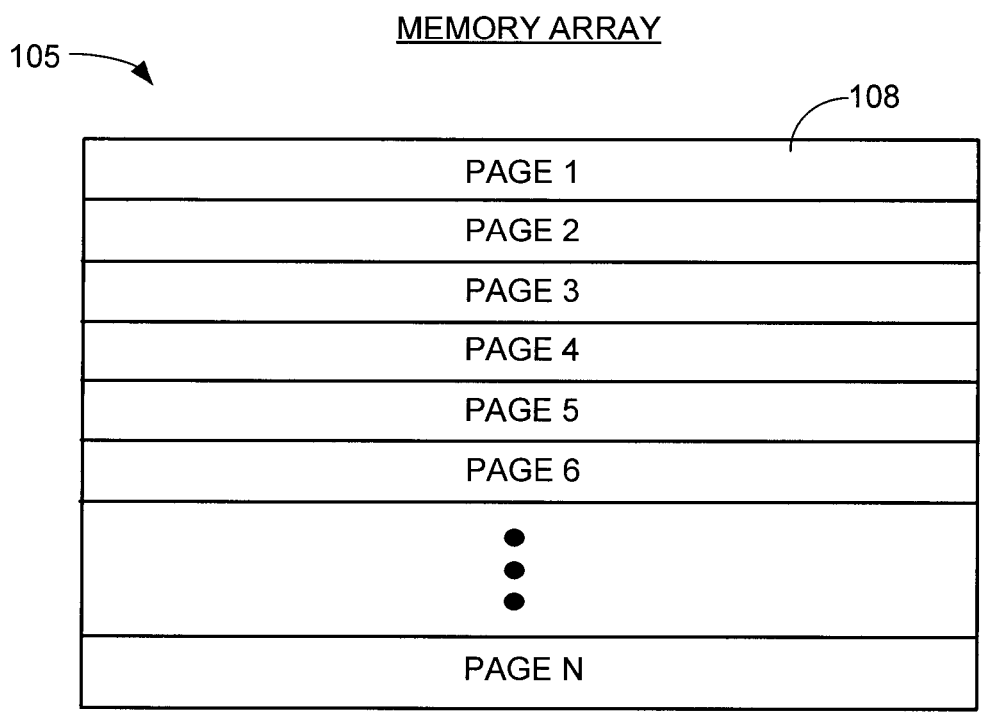
FIG. 2 shows a functional block representation of a portion of the memory array of the device of FIG. 1 arranged into a number of addressable pages of memory.

FIG. 2 provides a functional representation of portions of the non-volatile storage array 105 of FIG. 1. Non-volatile memory cells of the array 105 are arranged into addressable pages (blocks) 108. Each page of memory stores a selected amount of user data, such as 4096 bytes (4 KB) or some other value.

Page-level wear leveling can be employed by the controller 101 to track the erase and write status of the individual pages 108, and to select an available erased page when a new page of input data are to be written to the array 105. In this way, writes are distributed among the various pages throughout the array in a substantially even fashion.

In at least some embodiments, a full page worth of data is written to each page; that is, partial page writes are not permitted. Multiple LBAs may be written to the same page, and a given LBA's worth of data may by physically stored so as to span multiple pages. Filler bits may be appended to a selected set of input data if a full page worth of data is not supplied for writing in a given write operation. Error correction codes (such as parity bits, etc.) may be incorporated at the page level to correct errors as a full page worth of data is retrieved.

If data for a particular LBA are presently stored in a first page and the device 100 receives a write command to write new, updated data for that LBA, the controller 105 may select a second, new page to store the updated data and mark the LBA data in the first page as old data. When all of the data in a page are superceded, the page is marked for erasure. In some embodiments, groups of pages (such as 128 adjacent pages) are erased at the same time. Such groups are sometimes referred to as an erasure block.

Figure 3:
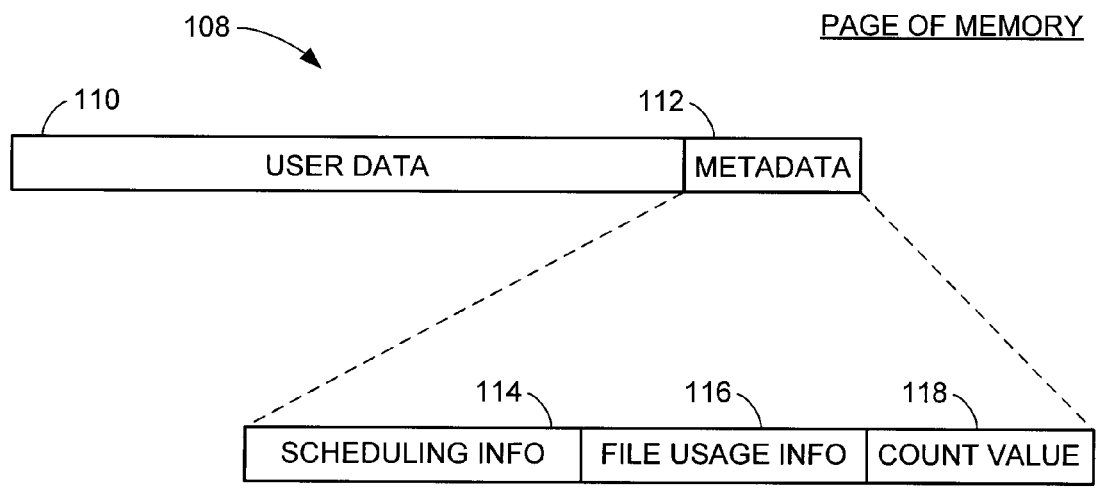
FIG. 3 provides an exemplary format for a page from FIG. 2.

FIG. 3 shows an exemplary format for a selected page 108 from FIG. 2. In some embodiments, the page 108 is arranged to have a user data portion 110 and a metadata portion 112. The user data portion 110 is configured to store up to a selected amount of user data such as 4 KB. The metadata portion 112 may constitute a few bytes and provides various data fields such as scheduling information field 114, a file usage field 116 and a count value field 118. Other metadata formats can be used, and the metadata need not be necessarily stored in each page.

The metadata in portion 114 can contain various types and amounts of data pertinent to the memory array 105 as well as to each page of memory 108. The metadata can comprise information about the frequency of various operations being conducted and information about upcoming scheduled events relevant to the page of memory. The metadata can identify the LBAs of the sectors stored in the associated page and the status of such LBAs. A separate LBA-PBA conversion table may be generated from the metadata and stored in controller memory (such as 102, FIG. 1).

The count value field 118 in FIG. 3 is updated to maintain a count value indicative of a number of write accesses previously carried out upon the associated page. The count value for a given page may reflect the total number of erase operations that have been previously carried out to erase memory cells along the page. Additionally or alternatively, the count value may indicate a number of write operations that have been previously carried out to write data to the page. Other forms for the count value can be used, such as separate tracking of erase and write operations, the number of write operations without regard to erase operations, etc.

Figure 4:
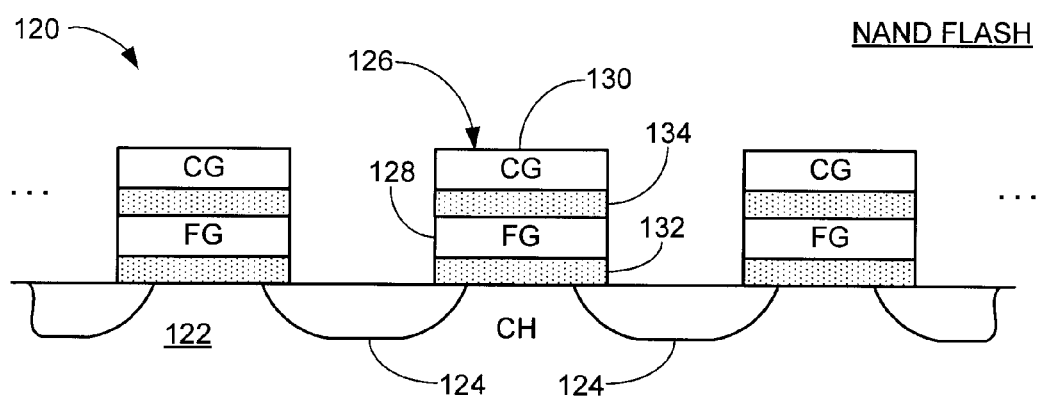
FIG. 4 illustrates a construction of individual memory cells in the array as Flash memory cells.

FIG. 4 shows an exemplary semiconductor construction for the array 105 in accordance with some embodiments. In FIG. 4, the individual memory cells of each page 108 are characterized as Flash memory cells 120. A semiconductor substrate 122 includes localized N+ doped regions 124. Gate structures 126 span adjacent regions 124 to provide a sequence of NAND configured devices. Each gate structure 126 includes a floating gate (FG) 128, a control gate (CG) 130, and intervening insulating (oxide) layers 132, 134.

Each Flash memory cell 120 substantially operates as a modified n-channel metal oxide semiconductor field effect transistor (MOSFET). Application of a suitable gate voltage to the floating gate (FC) 128 establishes a conductive channel (CH) between the adjacent doped regions 124, thereby generating a drain-to-source conductivity path.

During a programming operation, a write current through the channel results in the passage of charge through the lower oxide layer 132 to the floating gate (FG) 128. The presence of accumulated charge on the floating gate 128 serves to alter the requisite threshold voltage $V_T$ that needs to be applied to the control gate 130 to establish conductivity through the channel. Hence, the Flash memory cell 120 can store different programmed values in relation to different amounts of accumulated charge on the floating gate 128.

Figure 5:
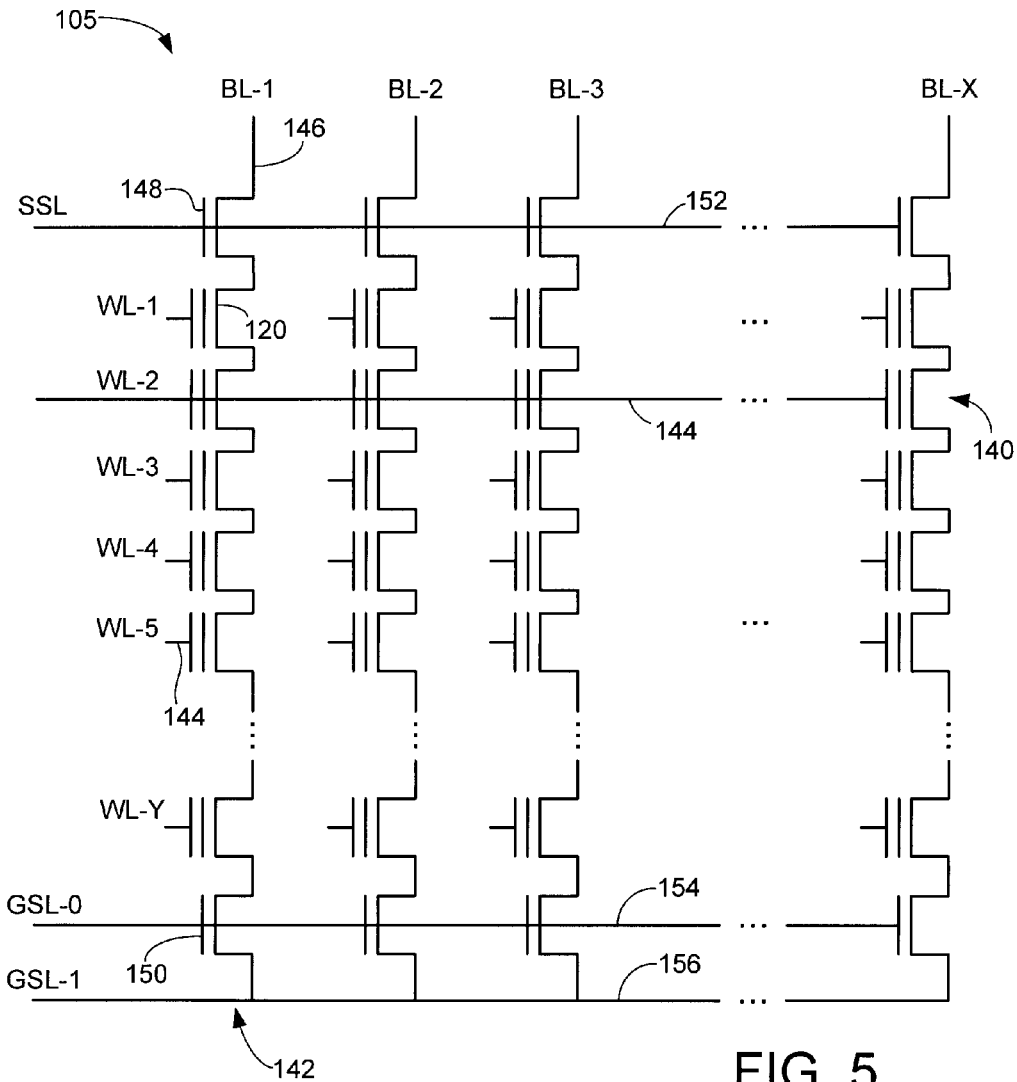
FIG. 5 shows a schematic representation of the array using Flash memory cells from FIG. 4.

FIG. 5 is a schematic representation of portions of the array 105 in accordance with some embodiments. Other arrangements can readily be used, so the schematic depiction of FIG. 5 is merely illustrative and not limiting. The array 105 in FIG. 5 is constructed from Flash memory cells 120 as depicted in FIG. 4.

The cells 120 in FIG. 5 are arranged into rows 140 and columns 142. Each row 140 constitutes a page of memory as shown previously in FIGS. 2-3, although other arrangements can be used. The cells 120 along each row are coupled to an associated word line 144, which interconnects the respective control gates 130 (FIG. 4) of the cells along each row. A total of Y word lines 144 are provided and denoted as WL-1 to WL-Y. This provides a corresponding number of Y pages which can be addressed as pages 1 to Y. Each cell 120 may store a single bit (e.g., a logical 0 or 1), or multiple bits of data (e.g., logical 00, 01, 10, 11).

The cells along each column 142 are arranged in a NAND configuration, although other arrangements can be used including but not limited to a NOR configuration. Each column 142 has an associated bit line 146. A total of X bit lines 146 are denoted as BL-1 to BL-X. Select transistors (MOSFETs) 148, 150 bound each column 142 and are selectively activated by SSL and GSL-0 select lines 152, 154. A low level, global select line GLS-1 156 interconnects the respective columns.

Read operations can be carried out on a page-by-page basis, so that the programmed states of the cells 120 along a given row 140 are retrieved in a page mode operation. In accordance with some embodiments, the contents of row 2 are read by applying a gate control voltage to the word line WL-2 with a selected magnitude that will differentiate between the different possible programmed states of the Flash cells 120 along the row.

Depending on the individually programmed states of the various cells, the cells along row 2 will either transition to a conductive state or remain in a non-conductive state responsive to the applied voltage on WL-2. The remaining word lines WL-1 and WL-3 through WL-Y receive a second, higher voltage that will ensure that all of the remaining Flash cells 120 in the block will be placed in a conductive state. Suitable voltages are provided to the SSL and GSL-0 lines 152, 154 to place the upper and lower transistors 148, 150 in a conductive state. In some embodiments, the SSL line may be provided with a VCC voltage (e.g., +3V) and the GSL-0 line may be provided with a VSS voltage (e.g., ground). The GSL-1 line may also be set to VSS. The non-selected word lines may be provided with a pass voltage of about +5V.

A voltage source applies the VCC voltage to each of the X bit lines in turn. As a selected bit line 146 receives the VCC voltage, current will be applied to the associated column as a read current. The sensed voltage across the column generated by this read current can be used to determine the programmed state of the cell 120 along the selected row. Multiple word line voltages of different magnitudes may be applied in succession to detect the programmed states of the cells when each cell stores multiple bits.

An erase operation is carried out to erase the existing programmed states of the cells 120 along a given page (or other subblock) of the array. In some conventions, a fully erased page will provide a bit sequence of all logical is (i.e., 111111 ... ). To erase page 2, the WL-2 bit line 144 is supplied with a first voltage, such as VSS, the remaining word lines WL-1 and WL-3 through WL-Y are provided with a second voltage such as VCC, the lower transistor select line GSL-0 is non-asserted, and a suitable relatively high voltage, such as +20V, is applied to the bit lines 146. Other techniques and values can be used. The erase operation will induce quantum tunneling of any charge on the floating gates 128 to the channel region of the substrate 122, effectively removing substantially all charge from the floating gates.

Once erased, a page is ready for a write operation. Write data are provided as a selected bit sequence (e.g., 01011100 . . . ). Logical 0s are written to those cells 120 along the row corresponding to the occurrences of 0s in the input sequence; cells that already store logical 1s are not written. Individual cells in page 2 can be written by applying a suitable write voltage such as +20V to the word line WL-2 and setting the remaining word lines WL-1 and WL-3 through WL-Y with a lower voltage such as VCC. The SSL and GSL-0 lines 152, 154 can be asserted to place the transistors 148, 150 in a conductive state, GSL-1 can be set to VSS, and the associated bit lines 146 can be supplied with appropriate write voltages such as 20V.

Both erase and write operations can involve migration of charge (e.g., electrons) across barriers to the floating gate 128. Over time, this migration of charge can result in a physical breakdown of the gate structure. Some Flash memory cells can only tolerate a relatively small number of write accesses (write/erase operations), such as on the order of 10,000 cycles before failure. It can be seen that even if page-level wear leveling is employed, localized writes at the bit level may nevertheless shorten the operational life of a given page if certain bit locations receive a substantially higher number of erases and writes.

The data written to the various pages of the device 100 can be encrypted prior to writing. Counter (CTR) mode encryption is a non-block mode that generally involves utilizing a count value that increments each time to encode the plaintext. Generally, CTR mode provides a stream cipher by encrypting successive values of a counter. The counter can be any suitable function which produces a sequence that does not repeat. An actual counter can be employed to provide the count sequence.

An advantage of CTR mode is that if the counter continuously increments without repeat, the same plaintext provides a different ciphertext output each time. Thus, if the same input data are provided for storage to the same page over and over, a different bit pattern in the encrypted output data would be written each time. This is referred to herein as a non-repetitive encryption process.

On the other hand, CTR mode encryption suffers from a number of disadvantages as well. One disadvantage relates to the fact that the count value range has to be substantially large to prevent rollovers. Thus, a relatively large count value, such as 24 or 32 bits, needs to be employed in order to provide a unique count value for each encryption operation (e.g., 24 bits would provide $2^{24}$=16,777,216 unique counts; 32 bits would provide $2^{32}$=4,294,967,296 unique counts).

More significantly, if the count value can be easily extracted such as physically accessing the individual pins of semiconductor devices within an SSD, the original plaintext can be easily recovered. In some cases a simple iterative attack can discern the count value without the need to physically extract the count value, or the stream value can be inferred from evaluation of the ciphertext. CTR mode encryption thus fails to provide adequate levels of data security for stored data.

Block encryption modes provide enhanced security over CTR, such as cipher block chaining (CBC) and XTS mode (XOR/Encryption/XOR based encryption with ciphertext stealing). CBC mode generally involves a chaining operation in which a previous block of ciphertext is logically combined with a current block of plaintext prior to an encryption operation. XTS mode is a tweakable block cipher such as described by IEEE 1619 and which employs a tweak to encrypt sequentially streamed blocks of plaintext.

While providing data security, these and other block modes generally operate to provide the same output ciphertext for a given set of input plaintext. Thus, if the same input data are provided for storage to the same page over and over, the same bit pattern in the encrypted output data would be written each time. This is referred to herein as a repetitive encryption process.

Accordingly, various embodiments of the present invention are generally directed to the implementation of a novel data security scheme to protect data stored in a memory array and which provides wear-leveling at the bit level in the array. The scheme generally combines repetitive and non-repetitive encryption processes to enhance data security and assure bit wear leveling. A seed value is initially derived based on a count value indicative of a number of times a write access has occurred on a page of memory. The seed value may also include additional variable data, such as an LBA associated with the input data. The seed value is supplied to a repetitive block encryption process such as CBC or XTS mode to generate encrypted output data, and the encrypted output data are written to the page of memory.

Figure 6:
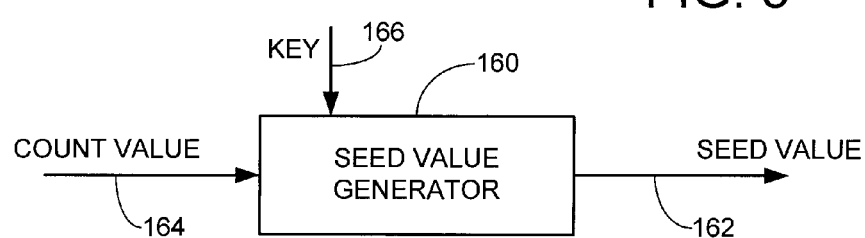
FIG. 6 illustrates a seed value generator block utilized in accordance with some embodiments.

FIG. 6 shows a seed value generator 160 in accordance with some embodiments. The generator 160 can be realized in hardware or in programming steps carried out by the controller 101 (FIG. 1). The generator 160 operates to output a seed value as a multi-bit sequence of selected length on output path 162 responsive to a count value provided on input path 164.

The count value is read from metadata associated with the physical target page to which input data are to be written. The seed value can incorporate other variables as well, such as the associated LBA (or LBAs) of the input data, a PBA associated with the target page, etc. The type and number of informational components utilized to generate the seed value are not limited.

As desired, the seed value can be generated using a cipher (key) such as supplied via path 166. The derivation operation to generate the seed value can arise from a variety of functions. In some embodiments an exclusive-or (XOR) function in combination with a counter mode encryption can be used. For example, the LBA and count value can be subjected to an XOR function and then encrypted by a cipher. While not required, it is contemplated that in some embodiments the generator 160 may provide a unique seed value each time a seed is generated. In other embodiments, seed values may repeat on an infrequent basis.

Figure 7:
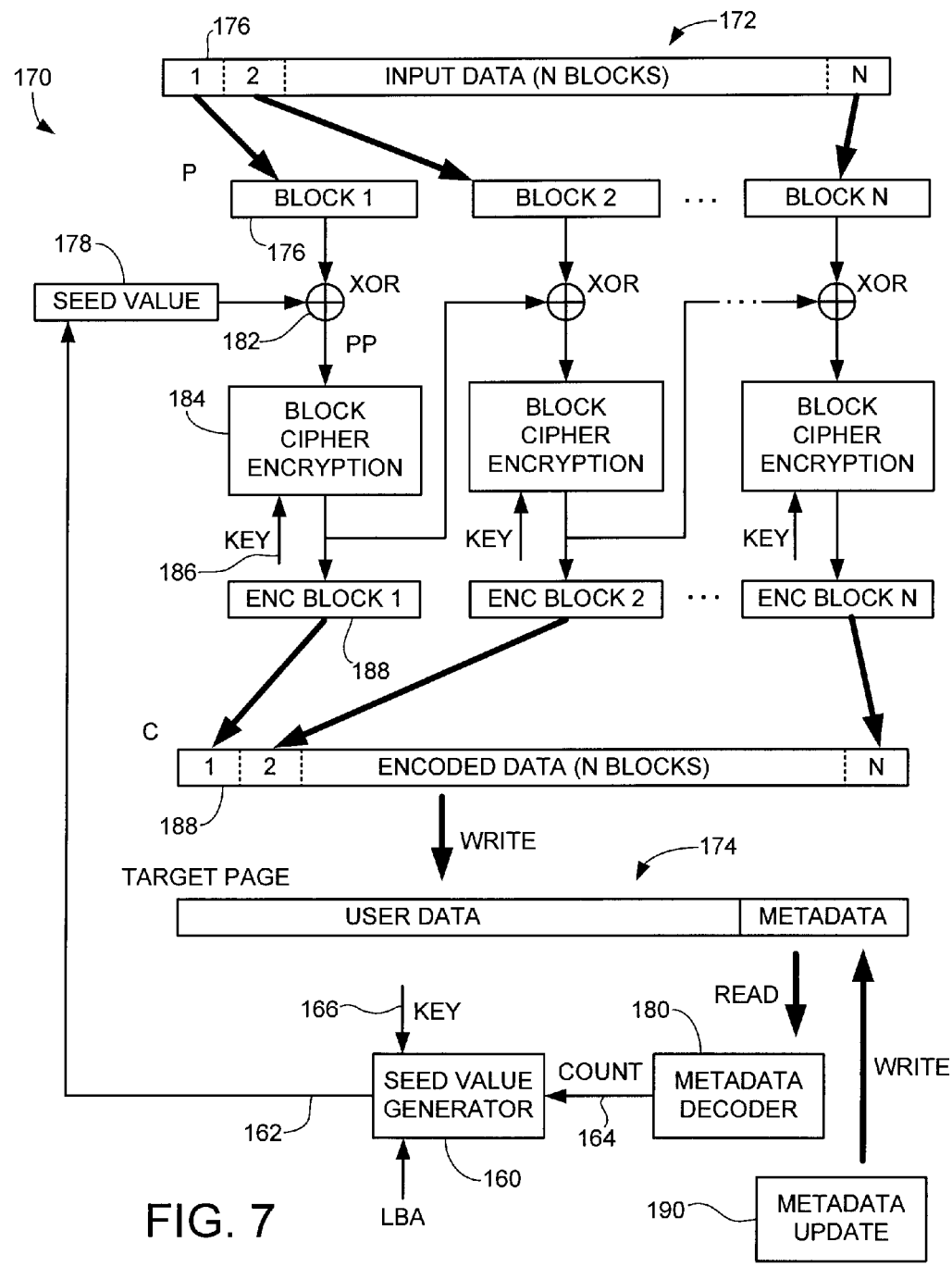
FIG. 7 shows the use of the seed value formed in FIG. 6 in conjunction with cipher block chaining (CBC) encryption of input data to provide wear leveling at the bit (cell) level.

FIG. 7 shows a block diagram for an encryption system 170 in accordance with some embodiments of the present invention. The encryption system 170 employs cipher block chaining (CBC) encryption to prepare input data 172 (plaintext, P) for writing to a target page 174. The system 170 can be incorporated in the read/write/erase circuit 106 of FIG. 1, or can be carried out via programming steps utilized by the controller 101. The input data 172 may constitute user data supplied to the system 170 by a host via the I/F 104, or may be internally generated for storage to the array 105.

The input data 172 are temporarily stored in a buffer memory location, and are arranged into N sequential blocks 176, where N is a plural integer. Each of the N blocks comprises a multi-bit block of M-bits, such as 128 bits although other block sizes can be used.

A seed value 178 is formed having the same size as the selected block size. In some embodiments, the seed value 178 is formed using a metadata decoder 180 which recovers and decodes the metadata associated with the target page 174. The metadata decoder 180 supplies the requisite input, including count value data, to the generator 160 which operates as previously discussed in FIG. 6. The seed value 178 serves as an initialization vector (IV) to initiate the chained encryption process.

A first selected block 176 of the input data 172, such as block 1, is logically combined with the seed value 178 to form an M-bit result (PP). The logical combination of the selected block and the seed value can take any suitable form, such as an XOR function 182. The output of the XOR function 182 is supplied to a block cipher encryption module 184 which carries out an encryption operation in accordance with a selected cipher (key) 186 to provide an M-bit encoded (ENC) block 1 188 of ciphertext (C). It is contemplated that the encoded block will have the same number of bits as the original unencoded block, although such is not necessarily required. Any suitable encryption operation can be carried out by the encryption module 184.

The encoded block 1 serves as a seed for the encoding of block 2. That is, the encoded block 1 is logically combined using a suitable function such as an XOR with unencoded block 2 and the result is encrypted to provide a second encoded block 2. This process continues until all N blocks of input data are encoded. Once the last block has been encoded, the encoded data are written to the target page 174. A metadata update block 190 can be used to output updated metadata with an updated write access count, and the updated metadata can be concurrently written to the target page 174 during the writing of the encoded data.

Figure 8:
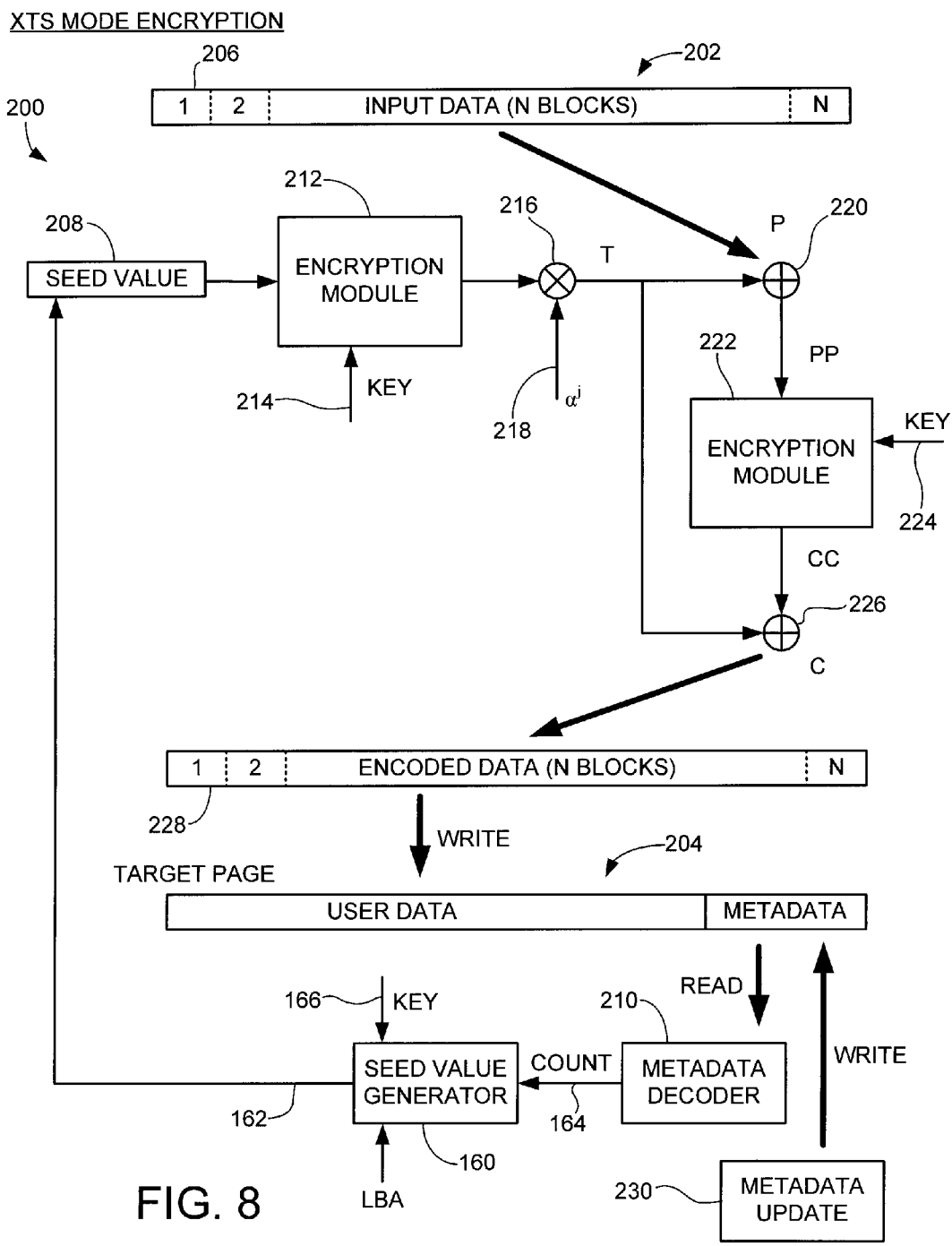
FIG. 8 shows the use of the seed value formed in FIG. 6 in conjunction with XTS mode (XOR/Encrypt/XOR based encryption with ciphertext stealing) to provide encryption of input data to provide bit wear leveling.

FIG. 8 shows an alternative encryption system 200 in accordance with some embodiments which utilizes XTS encryption. As with FIG. 7, the system 200 in FIG. 8 temporarily stores input data 202 (plaintext, P) in a buffer pending encryption and storage to a target page 204. The input data 202 are divided into a number of blocks 206, such as 128 bit segments. A seed value 208 is formed by the operation of metadata decoder 210 which reads the associated metadata, and generator 160 which forms the seed therefrom. In some embodiments, the seed value generator 160 forms the seed value from the count value associated with the target page 204 and an LBA value associated with the input data 202. The seed value 208 may be the same size as the blocks of plaintext, and is encrypted to form an initial tweak for the process.

The seed value is provided to an encryption module 212 which encrypts the seed value in relation to a selected cipher (KEY$_2$) 214. The output of the module 212 is logically combined using a multiplication operation at block 216 by a primitive element (d) 218 to form a tweak T, where j is the jth block in the sequence of blocks from 1 to N. The tweak T is logically combined using an XOR operation at block 220 with a first block 206 (e.g., block 1) of the plaintext P to provide tweaked plaintext PP.

The tweaked plaintext PP is encrypted by a second encryption module 222 in relation to a selected cipher (KEY$_1$) 224 to provide ciphertext CC. The encryption of block 222 may be the same mechanism employed by module 212, or may be a different encryption operation. The ciphertext CC is then logically combined with the tweak T using an XOR operation at block 226 to provide final ciphertext C (encoded block 1). The foregoing process is repeated for the remaining blocks of plaintext, using a new d value each time to generate a new tweak T for each block.

The processing of FIG. 8 can be characterized as an XEX (XOR/Encrypt/XOR) routine with ciphertext stealing via the respective tweaks T. When encrypting a tweak value, the tweak is first converted into a little-endian byte array. For example, a tweak value 123456789a$_{16}$ would correspond to a byte array 9a$_{16}$, 78$_{16}$, 56$_{16}$, 34$_{16}$, 12$_{16}$.

The encryption process uses multiplication of a 16-byte value by the jth power of a, a primitive element of a Galois Field GF($2^{128}$). The result is a 16-byte value which is treated as a byte array a0[k], k=0, 1, . . . , 15. This multiplication can be defined by the following procedure:

Input: j is the power of α byte array a$_0$[k], k=0, 1, . . . , 15

Output: byte array a$_j$[k], k=0, 1, . . . , 15    (1)

The output array can be defined recursively by the following formulas where i (the initial seed value) is iterated from 0 to j:

$a_i+1[0] \leftarrow (2(a_i[0] \bmod 128))\text{XOR}(135\lfloor a_i[15]/128\rfloor)$ $a_i+1[k] \leftarrow (2(a_i[k] \bmod 128))\text{XOR}\lfloor a_i[k-1]/128\rfloor$,
k=1, 2, . . . , 15    (2)

where mod=modulo, XOR=exclusive-or, and ⌊x⌋ is the floor of x. It will be noted that, conceptually, the operation can be characterized as a left shift of each byte by one bit with carry propagating from one byte to the next. If the 15th (last) byte shift results in a carry, a special value (decimal 135) is XORed into the first byte. This value is derived from the modulus of the Galois Field (polynomial $x^{128}+x^7+x^2+x+1$). Other methods for multiplication by α$^j$ can be utilized as well. The encryption sequence carried out by the system 200 can thus be summarized as:

$T=\text{enc}(\text{Key}_2, i)\text{XOR}\alpha^i$, where i=seed value    (3)

PP=P XOR T
CC=enc(Key$_1$, PP)
C=CC XOR T

The encoded blocks of ciphertext 228 (encoded blocks 1-N) are written to the target page 204. A metadata update block 230 can be used to concurrently update the count value during this operation.

In each of the alternative systems of FIGS. 7 and 8, the seed value will continually change even if the same input data and LBA are utilized. While the encrypted blocks of data are each written to the page of memory, the location and size of the encrypted blocks are not limited and can vary, as desired. The encryption routine is not limited in the manner in which the encrypted data are written to the page of memory. The numbers and types of ciphers are not limited as one or more encryption techniques can be utilized that each have one the same or different deciphering keys.

The input data will be effectively randomized through the encryption routine so that individual data bit writes are evenly distributed throughout memory cells of the page of memory. Thus, over time each individual memory cell in the page of memory will experience a substantially similar number of data writes due to the encryption routine randomizing the input data address within the page.

Data security is enhanced due to the multi-level nature of the encryption methodology. Even if an unscrupulous party physically obtains the count value by evaluation of the device, the count value cannot lead to decryption of the ciphertext. Thus, it is unnecessary to attempt to hide the count value. Also, the count value can be relatively small, for example 8 bits of metadata may be sufficient to record the total number of write accesses for each page. Even though this will allow a rollover every 256 write accesses ($2^8=256$), uniform bit level wear leveling should take place due to the further use of LBA (or other variables) in the seed value generation.

While it may be necessary to store the key values somewhere within the device, the keys can be hidden within the array or other storage locations of the device and loaded to local memory for use by the controller during initialization, making such difficult to detect. The keys can also be encrypted or separately calculated based on some suitable algorithm used by the controller to further enhance data security.

Figure 9:
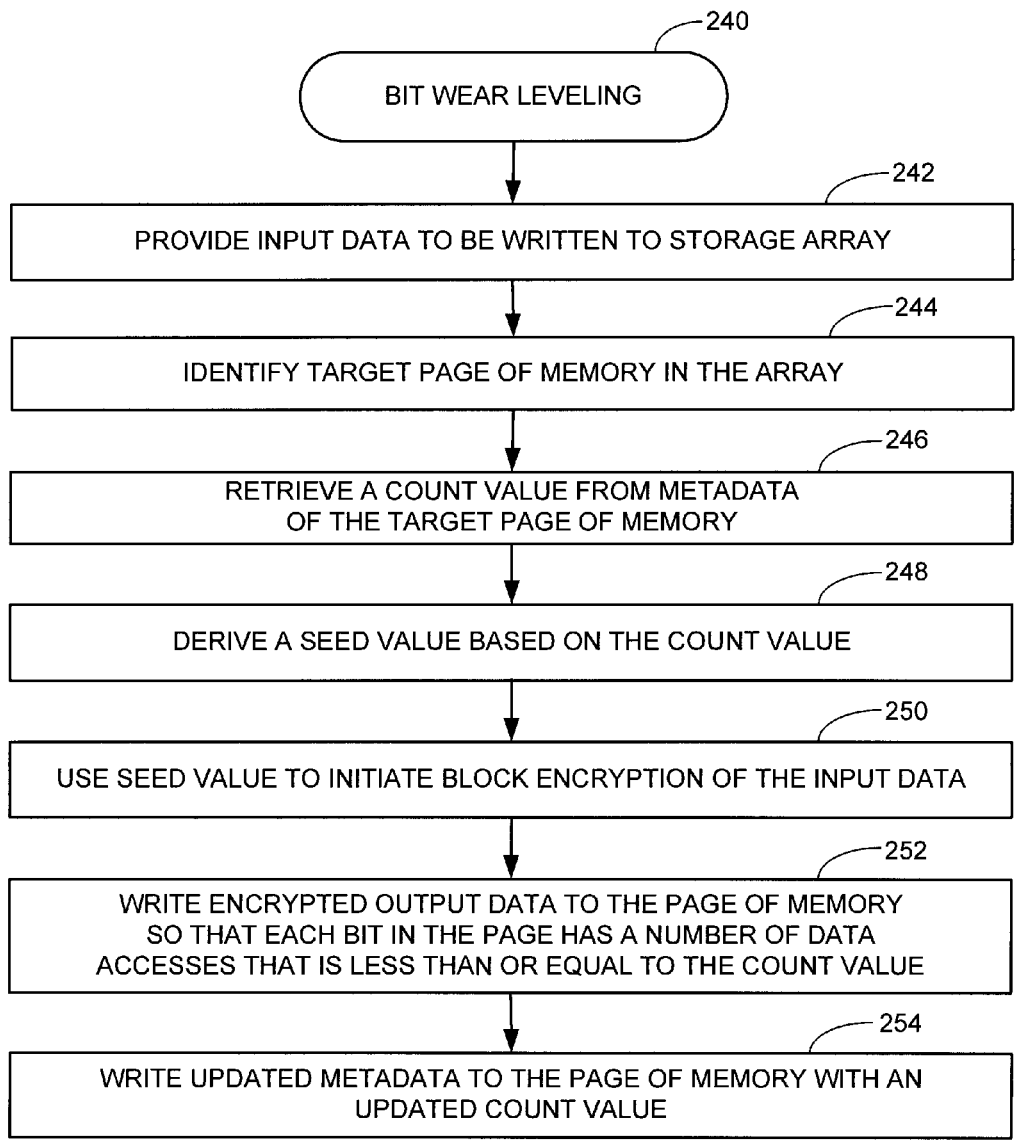
FIG. 9 is a flow chart for an exemplary bit wear leveling routine generally illustrative of steps carried out in accordance with various embodiments of the present invention.

FIG. 9 provides a flow chart for a BIT WEAR LEVELING routine 240 illustrative of the foregoing embodiments. The routine 240 begins in step 242 by providing an amount of input data to be written to a storage array such as 105 in FIG. 1. While it is contemplated in the present discussion that the input data will constitute a full page of data, it will be appreciated that less than, or more than, a page of memory's worth of data may be provided.

A target page of memory for the storage of the input data is identified at step 244. If page-level wear-leveling techniques are employed, a controller (such as 101) may select a next available page from the memory array as the target page. In such case, an erase operation may have previously taken place in order to prepare the target page for a new data write operation. Alternatively, an erase operation is carried out to the target page during step 244.

An existing count value is retrieved during step 246 from metadata associated with the target page. This count value will be indicative of a number of write accesses that have taken place upon the target page. While various embodiments count each erase operation as 1 write access and a subsequent write operation of input as 1 write access (for a total of two write accesses each time new data are written), it will be appreciated that other methodologies can be alternatively employed. For example, in alternative embodiments the numbers of erases and writes may be maintained separately, erase cycles may not be counted, etc.

The count value is used to derive a seed value at step 248. Counter (CTR) mode encryption may be employed during this step to derive the seed value. The count value extracted from the metadata can be incremented, multiplied by a scalar value, combined with a random number, a target address, a time/date stamp, etc. prior to or during the generation of the seed. The seed generation may further include an encryption operation using a cipher (key). The size of the seed can vary, but in some embodiments the size is selected to correspond to the size of subblock groupings of the input data, such as discussed above in FIGS. 7 and 8.

The seed value is used to initiate encryption of the input data at step 250. This can be carried out in a variety of ways, such as the cipher block chaining (CBC) discussed in FIG. 7, or XTS discussed in FIG. 8. Other forms of encryption can be utilized. Multiple forms of encryption can also be used; for example, if sufficient processing capability is provided, the plaintext can be subjected to CBC encoding to provide a first set of ciphertext, and the ciphertext can be subjected to XTS encoding to provide a second, final set of ciphertext. The encrypted data are thereafter written to the target page at step 252, and updated metadata are stored in a memory location (such as a metadata field of the page) at step 254.

The various embodiments illustrated herein operate to provide data security and memory reliability. The use of multiple encryption routines can produce a more secure data encryption that requires less metadata space for the count value. The enhanced encryption of the input data improves the randomizing of the encrypted data's target bit within a page of memory and more uniformly distributes the encrypted data throughout the page. It will be appreciated that the various embodiments discussed herein have numerous potential applications and are not limited to a certain field of electronic media or type of data storage devices.

For purposes herein, the references to rows and columns will be read broadly as relational identifiers in an ordered array of elements along different axes without constituting a specific physical layout. Thus for example, the term "row" may constitute a physical column without deterring from the spirit of the present invention. Reference to a "page" will be understood broadly as an addressable block to which a multi-bit set of data can be written, and may or may not constitute a full "row" or "column" of memory cells.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
providing input data to be written to a target page of memory in a storage array;
deriving a seed value in relation to a count of write accesses previously carried out upon the target page;
dividing the input data into a plural number N multi-bit blocks of M-bits each;
using the seed value to initiate block encryption of the N multi-bit blocks of input data to respectively form N multi-bit blocks of encrypted output data; and
writing the N multi-bit blocks of encrypted output data to the target page.

2. The method of claim 1, wherein the array comprises a plurality of non-volatile memory cells arranged into rows and columns, and wherein the target page of memory comprises a selected row of said memory cells.

3. The method of claim 1, wherein the count comprises a number of write operations that have been previously carried out to write data to the target page.

4. The method of claim 1, wherein the count comprises a value stored as metadata in a metadata field in the target page.

5. The method of claim 1, wherein the storage array comprises a plurality of pages of memory, wherein the method further comprises employing wear leveling at the page level, and wherein the target page comprises an available erased page in the array.

6. The method of claim 1, wherein the seed value is a multi-bit block of data of M-bits in length.

7. The method of claim 1, wherein the seed value is characterized as an initialization vector, and wherein the using step further comprises employing cipher block chaining (CBC) encryption to form the encoded output data.

8. The method of claim 1, wherein the seed value is characterized as an initial tweak value, and wherein the using step comprises employing XTS mode (XOR/Encryption/XOR based encryption with ciphertext stealing) encryption to form the encoded output data.

9. The method of claim 1, wherein the seed value is further formed in relation to a logical block address (LBA) associated with the input data.

10. The method of claim 1, wherein the seed value is formed by encrypting the count value with a cipher.

11. The method of claim 1, further comprising reading metadata stored in the target page to retrieve said count, and wherein the writing step further comprises writing updated metadata to the target page, the updated metadata comprising an updated count of write accesses performed upon the target page.

12. An apparatus comprising:
a buffer adapted to temporarily store input data to be written to a target page of memory in a storage array;
a seed value generation block which derives a seed value in relation to a count value indicative of a number of write accesses previously carried out upon the target page;
an encryption system which divides the input data into a plural number N multi-bit blocks and which uses the seed value to respectively encrypt the N multi-bit blocks of the input data to form N multi-bit blocks of encrypted output data; and
a write circuit that writes the N multi-bit blocks of encrypted output data to the target page.

13. The apparatus of claim 12, wherein the write circuit further operates to concurrently write an updated count value to a metadata field of the target page during said writing of the encrypted output data.

14. The apparatus of claim 12, wherein the count value comprises a number of erase operations that have been previously carried out to erase memory cells along the target page.

15. The apparatus of claim 12, wherein the encryption system is characterized as a cipher block chaining (CBC) encryption system which divides the input data into N multi-bit blocks of M-bits, wherein the seed value is a multi-bit block of data of M-bits in length, and wherein the encryption system sequentially encrypts said N multi-bit blocks by logically combining a selected block from the N multi-bit blocks with the seed value to form an M-bit result, applying an encryption routine to the M-bit result using a cipher to provide an M-bit encoded block, logically combining the M-bit encoded block with a second selected block from the N multi-bit blocks to form a second M-bit result, and applying an encryption routine to the second M-bit result using a cipher to provide a second M-bit encoded block, wherein the second M-bit encoded block forms one of the N multi-bit blocks of encrypted output data.

16. The apparatus of claim 12, wherein the encryption system is characterized as an XTS encryption (XOR/Encryption/XOR based encryption with ciphertext stealing) system which divides the input data into N multi-bit blocks of M-bits each, wherein the seed value is encrypted and combined with a primary element to form an initial tweak, and wherein the tweak is combined in an XOR/Encrypt/XOR sequence with the input data to form the N multi-bit blocks of encrypted output data.

17. The apparatus of claim 12, wherein the seed value generation block encrypts the count value with a cipher to generate the seed value.

18. The apparatus of claim 12, wherein each of the N multi-bit blocks of input data is M-bits in length, and each of the N multi-bit blocks of encrypted output data is M-bits in length.

19. The apparatus of claim 12, wherein the seed value generation block and the encryption system are embodied by a programmable controller which uses associated programming steps stored in a memory location.

20. The apparatus of claim 12, wherein the seed value comprises a multi-bit value of M-bits that is different each time input data are written to the target page to provide bit-level wear leveling of memory cells along the target page.

* * * * *